Figure 1:
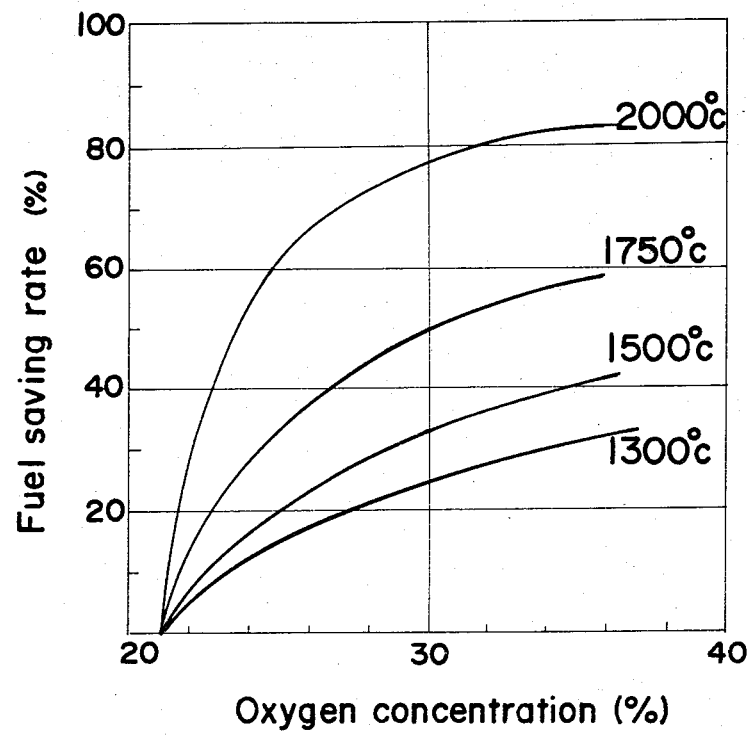
Figure 1:
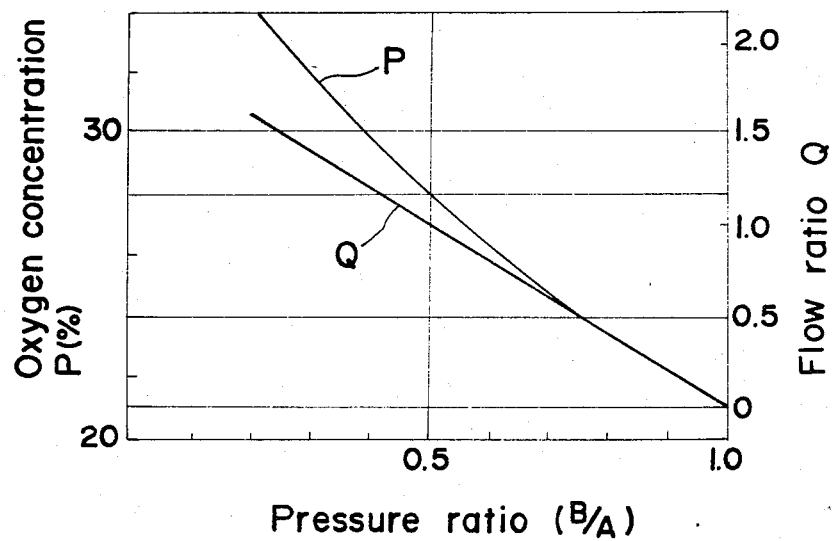

United States Patent [19]
Itoh et al.

[11] Patent Number: 4,537,606
[45] Date of Patent: Aug. 27, 1985

[54] OXYGEN ENRICHED GAS SUPPLY ARRANGEMENT FOR COMBUSTION

[75] Inventors: Yoshimasa Itoh, Machida; Shiroh Asakawa, Zama, both of Japan

[73] Assignee: Matsushita Electric Industrial Co., Ltd., Asaha, Japan

[21] Appl. No.: 553,430

[22] Filed: Nov. 21, 1983

Related U.S. Application Data

[63] Continuation of Ser. No. 331,902, Dec. 18, 1981, abandoned.

[30] Foreign Application Priority Data

Dec. 19, 1980 [JP] Japan ............................ 55-180686

[51] Int. Cl.³ ............................................. B01D 53/22
[52] U.S. Cl. ......................................... 55/158; 55/270
[58] Field of Search ................. 55/16, 18, 158, 270, 55/75

[56] References Cited

U.S. PATENT DOCUMENTS

| 3,369,343 | 2/1968 | Robb | 55/158 X |
|---|---|---|---|
| 3,489,144 | 1/1970 | Dibelius et al. | 55/158 X |
| 3,735,558 | 5/1973 | Skarstrom et al. | 55/16 |
| 3,930,813 | 1/1976 | Gessner | 55/16 |
| 3,930,814 | 1/1976 | Gessner | 55/16 |
| 3,976,451 | 8/1976 | Blackmer et al. | 55/158 |
| 4,174,955 | 11/1979 | Blackmer et al. | 55/16 X |
| 4,345,939 | 8/1982 | Ratschat | 55/75 X |

Primary Examiner—Robert Spitzer
Attorney, Agent, or Firm—Birch, Stewart, Kolasch & Birch

[57] ABSTRACT

An oxygen enriched gas supply arrangement for combustion which is so arranged that, by supplying air to a selective air permeating membrane cell, the flow rate and/or oxygen concentration of the oxygen enriched gas passing through the selective gas permeating membrane cell are controlled to predetermined conditions required for the combustion. The arrangement further includes devices for maintaining the humidity in the oxygen enriched gas thus obtained at a constant level and for removing pulsation therefrom, whereby a particularly suitable air supply source for various combustion equipment and apparatuses can be obtained.

12 Claims, 16 Drawing Figures

OXYGEN ENRICHED GAS SUPPLY ARRANGEMENT FOR COMBUSTION

This application is a continuation of application Ser. No. 331,902 filed on Dec. 18, 1981, now abandoned.

The present invention relates to an oxygen enriched gas supply arrangement for combustion purpose.

Recently, there has been a tendency towards a remarkable increase in energy cost, and accordingly, energy savings or conservation is strongly emphasized with respect to equipment and appliances which utilize energy. Particularly, with respect to combustion appliances, internal combustion engines, external combustion engines, etc. which directly employ energy in the form of fuels, various attempts have been made for the improvement of the combustion efficiency thereof, one of which is represented by an oxygen enriched combustion process. As is well known, combustion is an oxidizing reaction using oxygen as a fuel from a chemical point of view, in which the heat of reaction produced thereby is utilized for various purposes. Generally, the term "combustion" has normally referred to combustion or burning in a natural atmosphere, i.e. in an atmosphere with an oxygen concentration of 21 Vol. %. The heat of reaction generated at this time is imparted to exhaust gases (for example, carbon dioxide, moisture, and nitrogen gas in air, etc.), and if unabled to be recover, results in an exhaust gas loss, or the combustion temperatures are affected by the capacity of the exhaust gas. In any case, the smaller the amount of the exhaust gas is, the larger is the gain in the amount of heat which may be utilized. The factor which has a large influence in exhaust gases is an inert gas, especially, nitrogen which is contained in the moisture produced and in the air, and not related to the combustion. By reducing the amount of nitrogen as described above, increases in combustion speeds and burning temperatures are noticeable, resulting in a large energy saving in the combustion. Reduction in the amount of nitrogen means the employment of oxygen enriched air, which makes it possible to achieve a large saving in combustion, even if the oxygen enrichment is only several % as shown, for example, in FIG. 1(a). In the graph of FIG. 1(a), the abscissa represents oxygen concentration of the oxygen enriched air, while the ordinate denotes fuel saving rate in combustion, with respective combustion temperatures being taken as parameters. Although the above graph shows an example in which natural gas (13A) is employed as a fuel, a similar trend to the above may also be noticed with respect to other kinds of fuels. As is clear from the graph of FIG. 1(a), energy saving performance (i.e. fuel saving effect) is improved towards the high temperature utilizing regions, and the process is effective for a wide number of applications such as glass melting, glass processing, metal melting, ceramic calcination, general boilers for various forgings, etc. Moreover, it can be seen that several % to 20% increase or so in the oxygen enriching rate shows a remarkable effect, and that oxygen at high concentration is not necessarily required. For a secondary effect, the employment of oxygen enriched air provides a particularly superior effect for precision processing, with flame length becoming short and sharp, for example in the pean burner during combustion.

As is seen from the foregoing description, combustion with the use of an oxygen enriched gas has various advantages and obvious features especially in the energy saving area, and for specific realization of such advantages in actual applications, it is strongly recommended to supply oxygen at low cost, or oxygen enriched air.

At present, although oxygen enriched air required for combustion is generally supplied from oxygen cylinders, there are problems with respect to the use of such cylinders for providing high pressure gas, such as the necessity for replacing cylinders, the danger of gas leakage, and the like. Additionally, the use of liquid oxygen other than the use of oxygen cylinders may also present similar problems to the above.

As stated earlier, in the present day in which energy saving is actually required, it is necessary to use the oxygen which is inexhaustibly present in the air in a still more efficient manner, and therefore, the present invention intends to provide an oxygen enriched gas supply arrangement which may be applied to combustion at high efficiency.

It is already known that most high polymeric membranes have a larger permeability constant with respect to oxygen, than the permeability constant thereof with respect to nitrogen, in the state where no pin holes are present. From the above fact, it is of course possible to employ such a high polymeric membrane for the selective separation of oxygen from nitrogen, but in the case where oxygen enriched gas obtained from an arrangement utilizing the high polymeric membrane is used for combustion, conditions as described below must be satisfied, which conditions, however, are considerably different from the conditions required for medical purposes (disclosed, for example, in Japanese Laid Open patent applications Tokkaisho Nos. 51/3291, and 51/6876, etc.). The above fact results from the entire difference in the using conditions.

Generally, combustion arrangements include various combustion methods and combustion temperatures, different configurations and sizes of the units, etc., and the oxygen concentration and flow rate of the oxygen enriched gas are set forth according to the individual arrangements. Accordingly, in the utilization of oxygen enriched gas for a combustion arrangement, it is necessary to provide an oxygen enriched gas supply arrangement which meets the above requirements. However, for satisfying the above conditions with respect to the manufacture of the oxygen enriched gas supply arrangement, an apparatus merely for obtaining oxygen enriched gas is not sufficient for the purpose. In other words, the supply arrangement must be capable of coping with various changes, for example, in the state of operations, using conditions, external conditions for the arrangement, etc., which requirements are considerably different from the requirements for the oxygen enriched gas which is utilized for other purposes.

Specific requirements for the oxygen enriched gas supply arrangement for combustion may be raised as follows.

In the first place, it is necessary that the oxygen concentration is variable as required by the combustion apparatus, because in the case where the oxygen enriched gas is burned through mixing thereof with gas or liquid fuel, combustion temperatures and combustion speeds vary remarkably depending on the oxygen concentration at that time. More specifically a temperature rise of about 80° C. is noticed upon an increase in the oxygen concentration of only 1%, while simultaneously, the flame length is greatly altered due to the marked variation in the combustion speed. From the above facts, in the oxygen enriched gas supply arrangement, it is necessary that the concentration of oxygen required by the combustion apparatus is arranged to be variable.

In the second place, it is required that the flow rate of the oxygen enriched gas is arranged to be variable in the similar manner as in the above first requirement. In other words, in order to meet the conditions of the combustion apparatus or for burning at a value close to the stoichiometric or theoretical combustion, the flow rate must be adapted to be variable.

Thirdly, the oxygen enriched gas supply arrangement is required to be adaptable for external conditions, mainly with respect to the variations in temperatures. More specifically, in the arrangement of the present invention employing a selective gas permeable membrane, since the gas permeation amount of the membrane is varied by the temperature variations, thus resulting in alterations in the flow rate of the oxygen enriched gas, it is necessary to eliminate such variations.

In the fourth place, it is required to be adaptable also to humidity as well as to external temperatures. Generally, permeation of moisture with respect to a high polymeric membrane is known to be larger than that of oxygen and nitrogen, and in fact, under a state of high humidity, a large amount of moisture is contained in the permeated gas, which may give rise to variations in heat conduction and oxygen concentration during combustion due to the presence of water vapor in the enriched gas, and therefore, it is necessary to maintain the moisture at a constant level as far as possible.

In the fifth place, with respect to oxygen supply arrangements, although a vacuum pump is employed in the arrangement of the present invention for providing a pressure difference between a primary side and a secondary side of the selective gas permeating membrane, the flow speed of the oxygen enriched gas as obtained thereby tends to fluctuate (pulsate) to a large extent, resulting in pulsations of flame during combustion. Therefore, such pulsations must also be prevented.

By solving the problems as described in the foregoing, oxygen enriched gas efficiently usable for combustion can be obtained.

The requirements as stated so far will be further described in detail hereinbelow.

Generally, as one of the practices for obtaining optimum amounts of oxygen concentration and flow rate of the oxygen enriched gas for effecting theoretical combustion suitable for combustion gas amount or calorific amount thereof, it is conceived to vary the differential pressure at opposite sides of the selective gas permeating membrane within the arrangement. However, the object as described above can not be achieved by merely changing the differential pressure, because there is a relationship as follows with respect to the differential pressure and permeating flow rate. The permeating flow rate is represented by the following equations.

$$F(N_2) = K \cdot \bar{P}(N_2) \cdot \Delta P(N_2) \quad (1)$$

$$F(O_2) = K \cdot \bar{P}(N_2) \cdot \Delta P(O_2) \quad (2)$$

where $F(N_2)$ and $F(O_2)$ are respectively permeating amounts of nitrogen and oxygen, K is a physical constant for the membrane $\bar{P}(N_2)$ and $\bar{P}(O_2)$ respectively denote permeability coefficients for nitrogen and oxygen according to the membrane materials, and $\Delta P(N_2)$ and $\Delta P(O_2)$ represent partial differential pressures of nitrogen and oxygen with respect to the membrane surface. More specifically, as is understood from the above equations, the total flow rate Ft permeated through the membrane is represented as $Ft = F(N_2) + F(O_2)$, and the permeating flow rate Ft may be controlled to the required level upon alteration of the differential pressure, but meanwhile, the oxygen concentration $(F(O_2)/F(t))$ is also varied simultaneously. The state as described above is shown in FIG. 1(b) based on the results of experiments. In the graph of FIG. 1(b), air (21% oxygen) is employed for the primary side, and the abscissa represents a pressure ratio (B/A) between the pressure A at the primary side and the pressure B (permeated gas) at the secondary side of the selective gas permeating membrane, while a curve P and the left side ordinate denote the oxygen concentration (%) at that time. A curve Q and the right side ordinate show the flow rate with respect to a permeation amount assumed to be 1 at a pressure ratio B/A=0.5. As is seen from the above results, upon lowering of the differential pressure, the permeating amount Ft is also reduced, with consequent reduction in the oxygen concentration $(F(O_2)/F(t))$. Although the absolute value for the above will be altered depending on the permeating performance of the membrane and exhaust capacity of the pump, the trend as described above may be said to apply to any state. Therefore, the problems related to achieving the necessary oxygen concentration and flow rate can not be solved through mere alterations of differential pressures, but effects as follows should also be taken into account.

In general, most of the high polymeric membranes tend to show an increase in the permeating rate thereof through a temperature rise, as represented by the following equation $$\bar{P} = \bar{P}o \, exp - (Ep/kT) \quad (3)$$

As is seen from the above equation, the increase in the permeating amount follows an increase of the permeability coefficient $\bar{P}$ due to a rise in the temperature T, further being correlated with activating energy Ep.

Figure 1C:
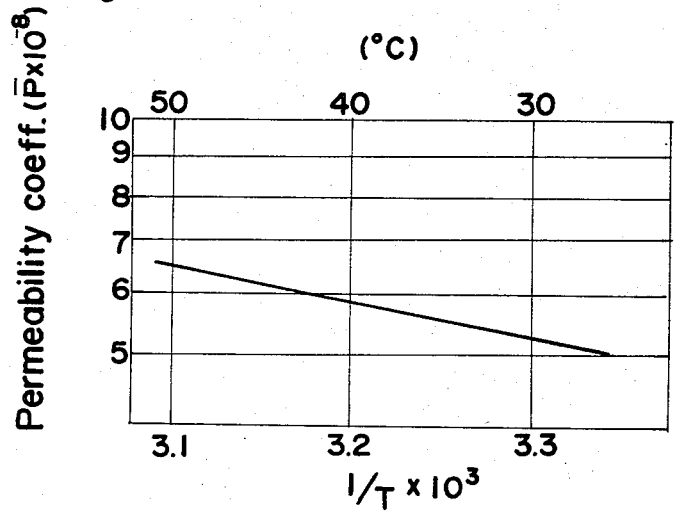

Table 1 gives examples of the activating energy Ep, while a graph in FIG. 1(c) shows the relation between temperatures and oxygen permeability coefficients for polydimethyl siloxane having a small activating energy Ep, in which graph, an increase of the permeability coefficient by as much as about 10% is realized upon an increase in temperature of 10° C. In other words, the above fact implies that the oxygen enriched gas supply arrangement depends largely on the temperature variations under the circumstances where it is installed, and should be adaptable for such temperature variations. Normally, circumstances under which combustion apparatus are to be installed are considerably strict, with temperatures around the apparatus varying in the range of from 0° C. or so to 40° C. or thereabout through four seasons of the year, and therefore, the permeating flow rate should be controlled at all times with respect to the temperature variations of several tens of degrees. Furthermore, as is noticed from Table 1, below, since the activating energy Ep for oxygen is not equal to that of nitrogen, and the permeability coefficient $\bar{P}$ due to the activating energy Ep and temperature T is different with respect to oxygen and nitrogen, it is natural that the flow rate variations of oxygen and nitrogen with respect to the temperature variations are not in agreement with each other.

TABLE 1

| Material | Ep (Kcal/mole) | |
|---|---|---|
| | Oxygen | Nitrogen |
| Polybutadiene | 7.1 | 8.2 |
| Ethyl cellulose | 4.0 | 4.2 |
| Polypropylene | 11.4 | 13.3 |
| Polystyrene | 4.3 | 7.6 |
| Polydimethy siloxane | 2.1 | 2.6 |

With respect to the external circumstances, a similar state also applies to the humidity. As described earlier, in most cases, the permeation coefficient for water is larger than that for nitrogen and oxygen gases, and this fact means that, when it is intended to selectively separate oxygen in the atmosphere through utilization of a membrane, moisture is naturally permeated therethrough simultaneously, with the result that the partial pressure of the water component in the gas subjected to the permeation, becomes larger than that in the atmosphere, and thus, dew may be formed in correspondence with the external temperatures. In the phenomenon as described above, the humidity increase in the permeated gas has a particular effect on the combustion. In other words, there are cases where the combustion efficiency may be lowered due to variations of partial pressure for each gas, and variations in the heat conduction during combustion through mixing of water vapor, by a humidity increase in the enriched gas. The effect of humidity may differ depending particularly on the places of installation of the arrangement in a similar manner as with temperatures, but in the case where the apparatus is used for combustion, external circumstances are as poor as for temperatures, and in similar conditions as in the outdoors. In other words, the humidity variations in Japan throughout the year are in the range of several tens to 90%, and under such a situation, the requirements for combustion use are not related to how to reduce the humidity, but how to maintain the humidity constant, and as a matter of fact, it may be contrived how to bring the humidity close to the minimum level throughout the year.

Subsequently, it becomes important to see how the oxygen enriched gas thus obtained is stable. In the arrangement according to the present invention, transportation of gas is effected by a vacuum type pump for providing a pressure difference between the primary side and secondary side of the selective gas permeating membrane, and what is brought into question in such an arrangement is the characteristics of the pump itself. In other words, in a pump which is normally operated through a cycle of pressure reduction to compression, the gas to be transported thereby is intrinsically subjected to pulsations. Therefore, if the oxygen enriched gas fed by the vacuum type pump is merely employed as a combustion gas, there are cases where the flames become pulsated, if the pulsation is excessive, and further, where the optimum burning state is broken in the worst case. Accordingly, it is an essential requirement for combustion gas supply equipment to provide as stable a gas as possible.

Accordingly, an essential object of the present invention is to provide an oxygen enriched gas supply arrangement for combustion purpose which is capable of satisfying the requirements as described in the foregoing for a combustion oxygen enriching apparatus.

Another important object of the present invention is to provide an oxygen enriched gas supply arrangement of the above described type which is simple in construction and stable in functioning at high reliability.

In accomplishing these and other objects according to one preferred embodiment of the present invention, there is provided an oxygen enriched gas supply arrangement which comprises a housing, a selective gas permeating membrane cell provided in the housing, means for supplying air to the selective gas permeating membrane cell for obtaining oxygen enriched gas therethrough, and means for controlling flow rate and/or oxygen concentration of oxygen enriched gas to be obtained through the selective gas permeating membrane cell. The arrangement further includes means for controlling humidity of the oxygen enriched gas to a predetermined value, and means for removing pulsation in the oxygen enriched gas.

By the arrangement according to the present invention as described above, an improved oxygen enriched gas supply arrangement for combustion has been presented, with the substantial elimination of disadvantages inherent in the conventional arrangements of this kind.

Figure 2:
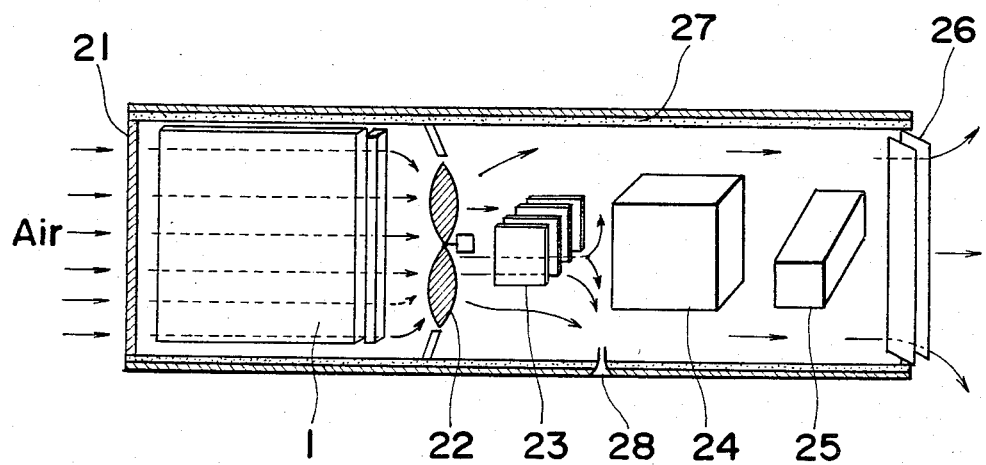
Figure 3:
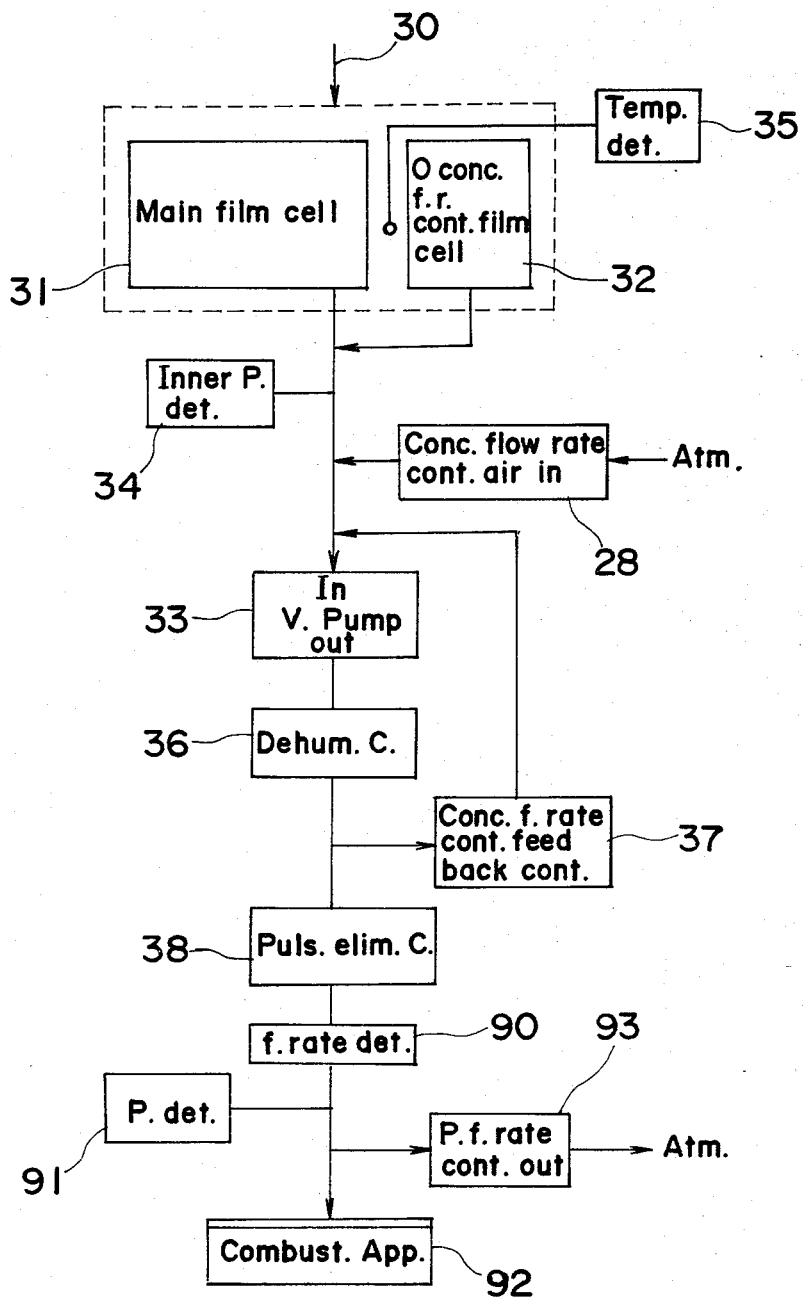
Figure 4:
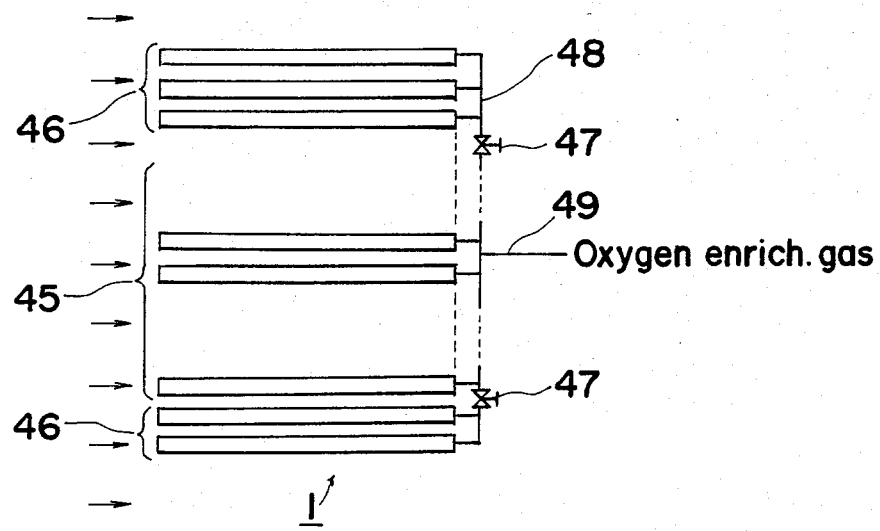
Figure 5:
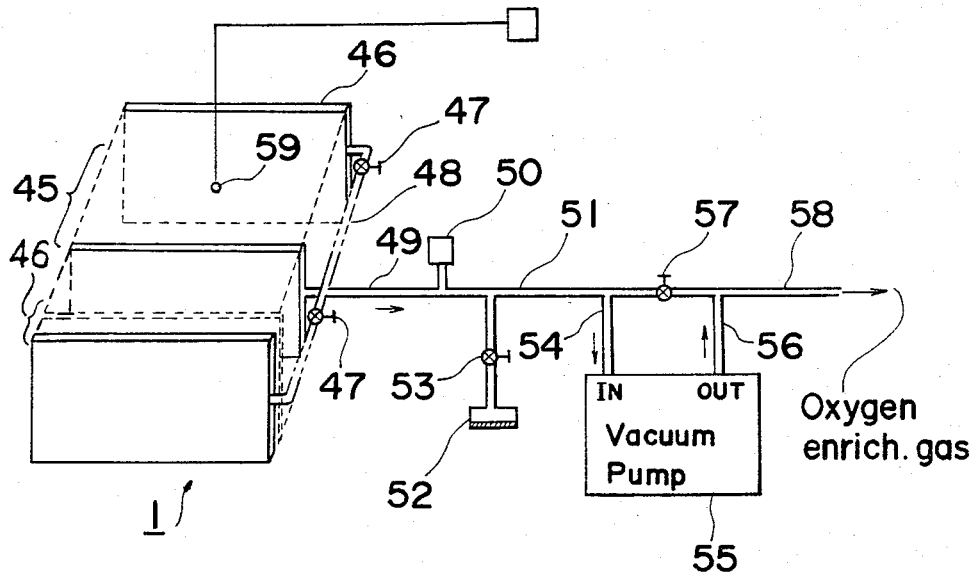
Figure 6:
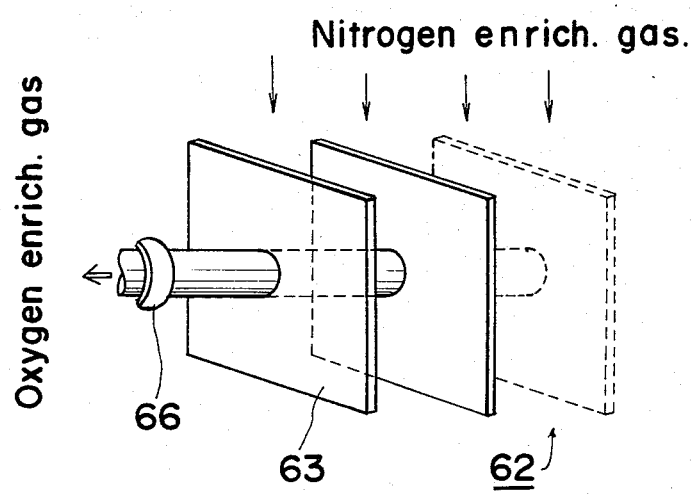
Figure 7:
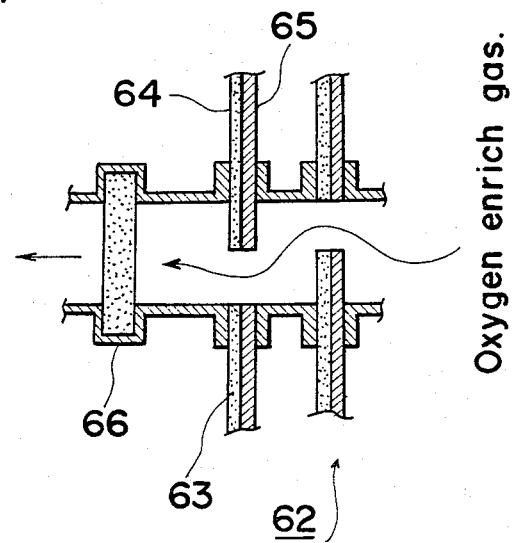
Figure 8:
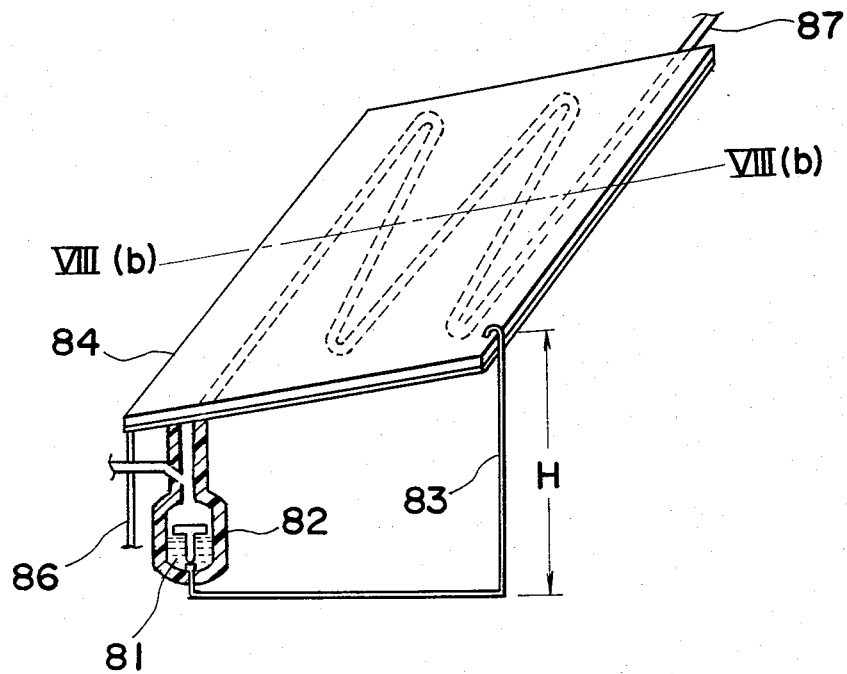
Figure 8:
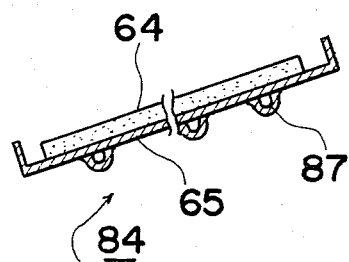
Figure 9:
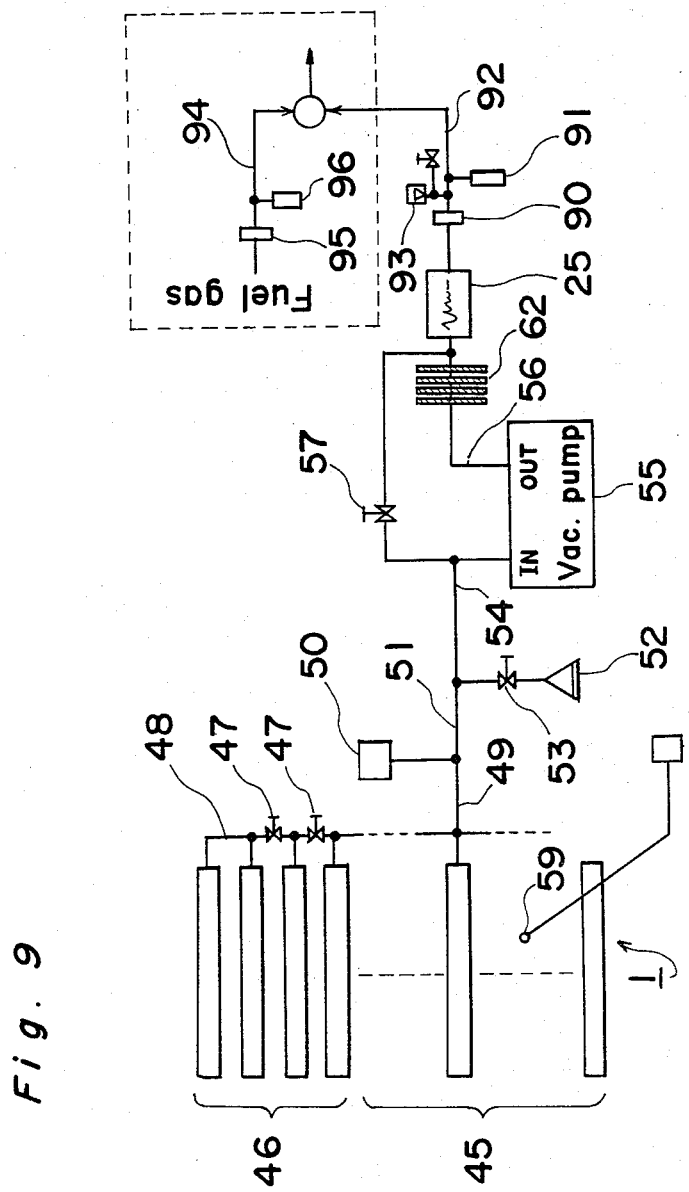
Figure 10:
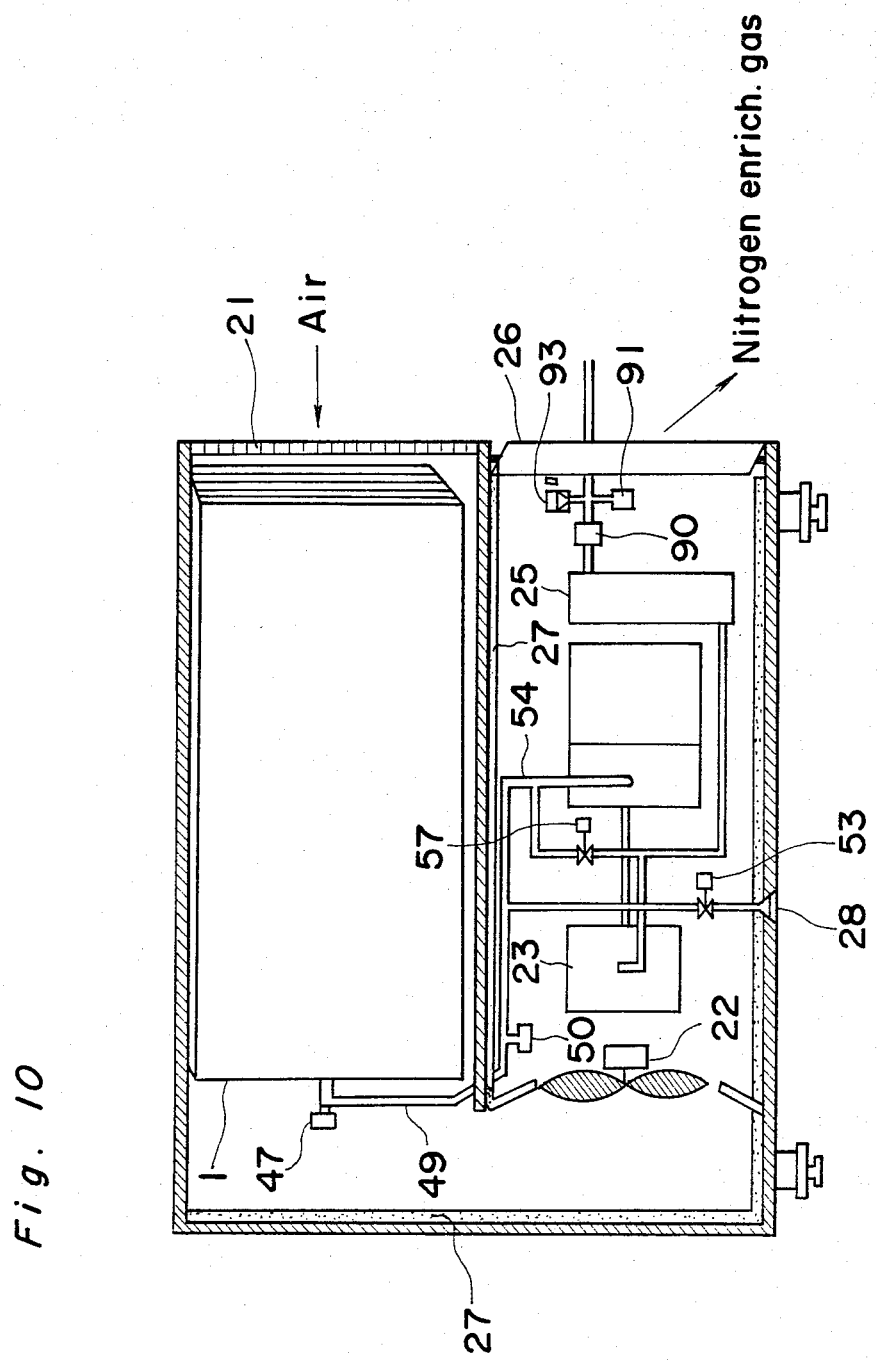
Figure 11:
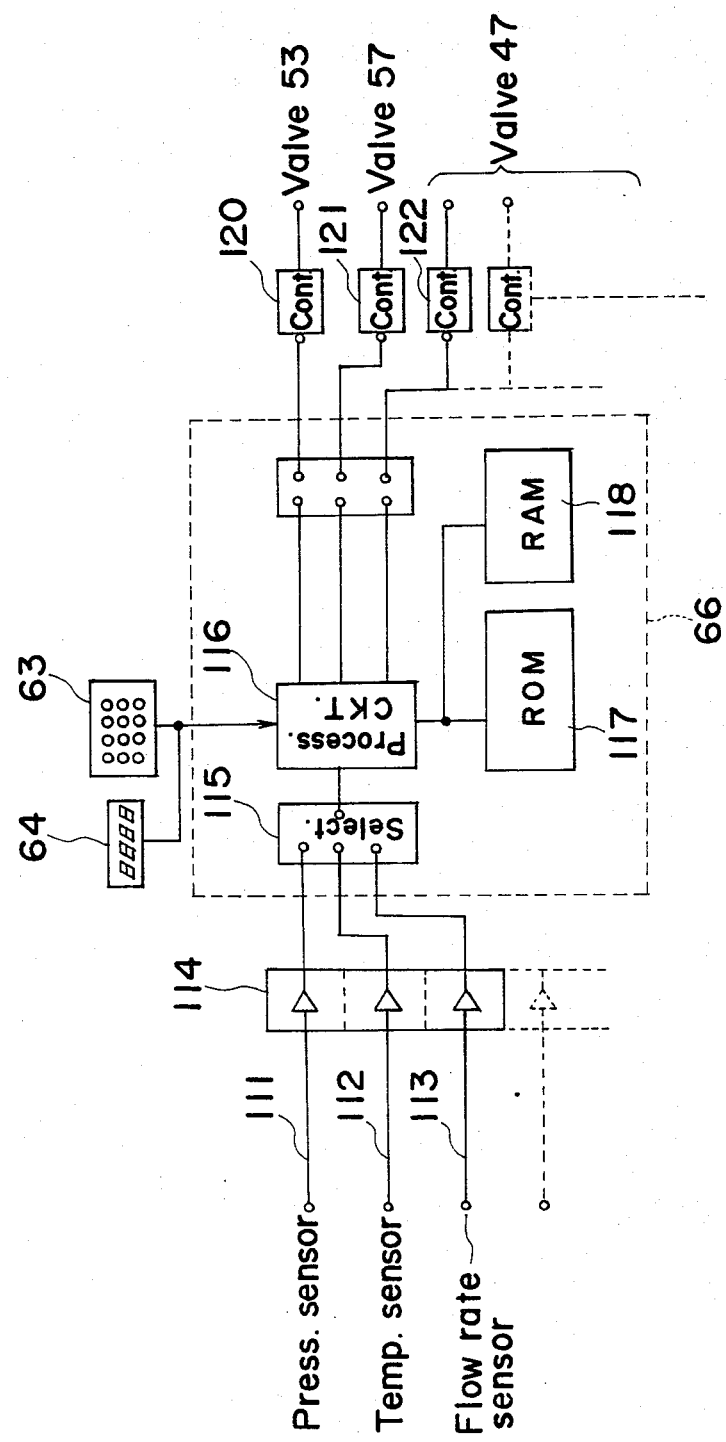
Figure 12:
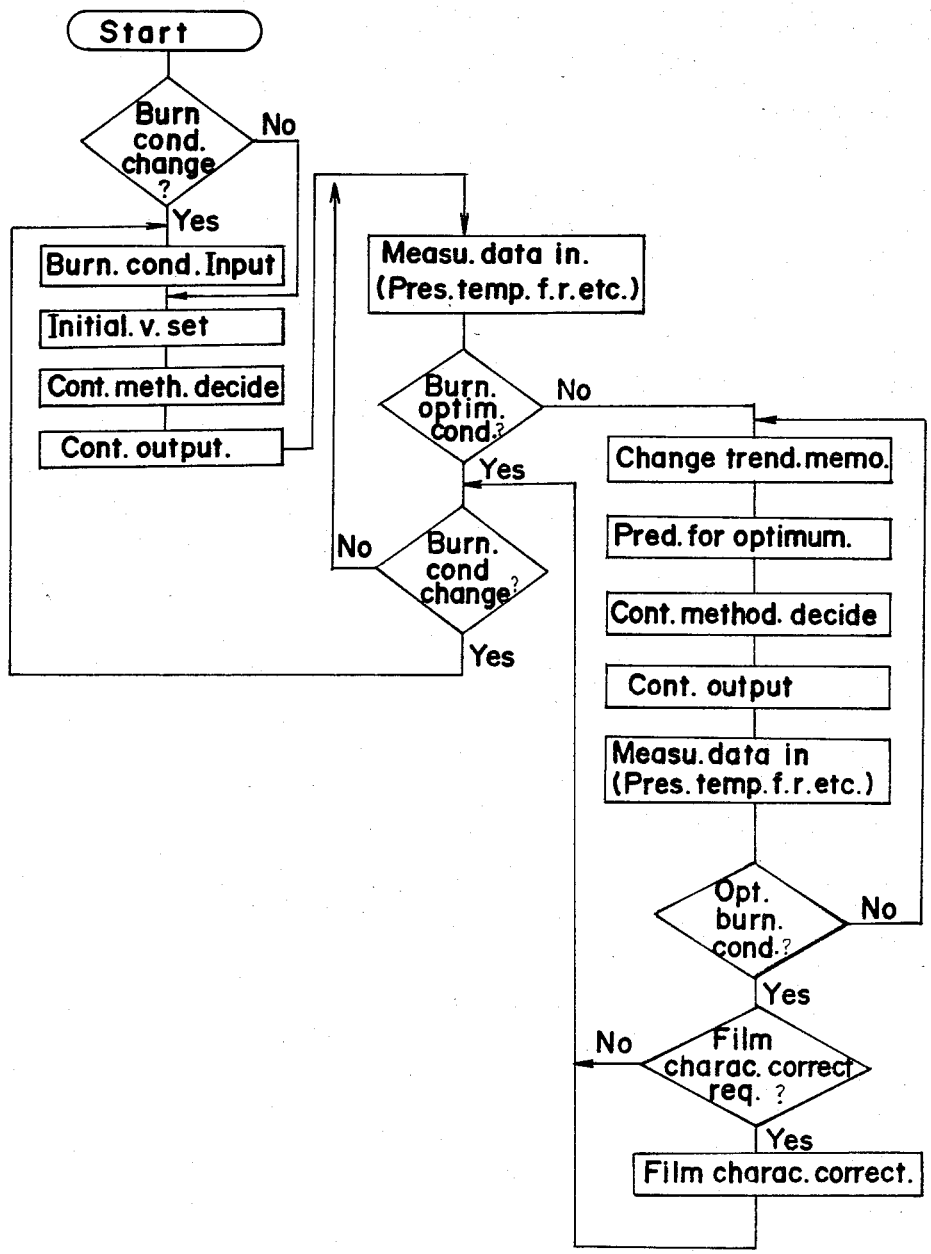
Figure 13:
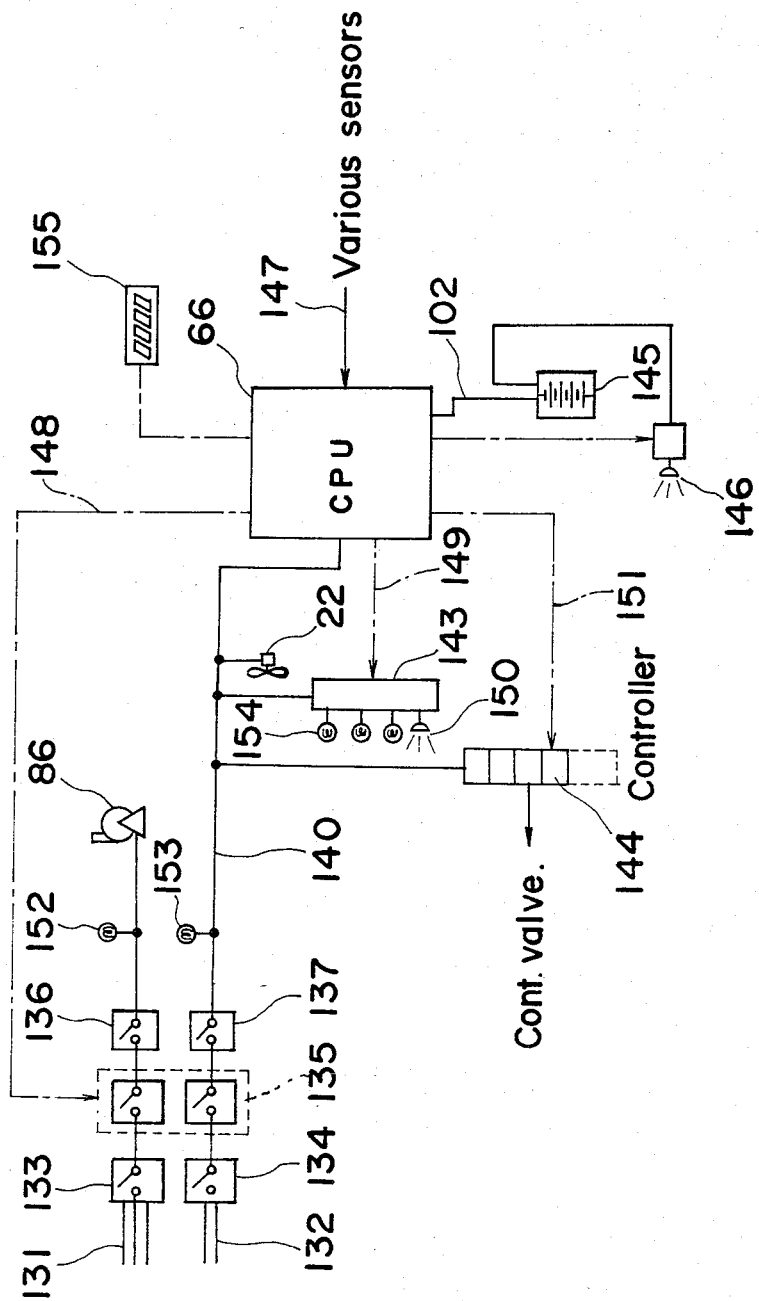

These and other objects and features of the present invention will become apparent from the following description taken in conjunction with the preferred embodiment thereof with reference to the accompanying drawings, in which;

FIG. 1(a) is a graph showing the relation between the oxygen concentration and combustion fuel saving rate (already referred to), FIG. 1(b) is a graph showing the relation among the pressure difference at opposite sides of a selective gas permeating membrane, oxygen concentration and flow rate (already referred to), FIG. 1(c) is also a graph showing the relation between the temperature of the selective gas permeating membrane and permeability coefficient (already referred to), FIG. 2 is a schematic sectional view explanatory of the principle and construction of an oxygen enriched gas supply arrangement for combustion according to one preferred embodiment of the present invention, FIG. 3 is a block diagram explanatory of the structure and principle of functions of the oxygen enriched gas supply arrangement of the present invention, FIG. 4 is a fragmentary diagram illustrating the structure of a membrane cell to be employed in the arrangement of FIG. 1, FIG. 5 is a schematic perspective view explanatory of an oxygen enriched gas supply system in the arrangement of the present invention, FIGS. 6 and 7 are a perspective view and a cross sectional view of a humidity eliminating or dehumidifying section to be employed in the arrangement according to the present invention, FIGS. 8(a) and 8(b) are a perspective view, and a cross section taken along the line VIII(b)—VIII(b) in FIG. 8(a), of a humidity eliminating section according to another embodiment of the present invention, FIG. 9 is a block diagram illustrating the overall construction of the arrangement according to the present invention, FIG. 10 is a view similar to FIG. 2, which particularly shows a further modification thereof, FIG. 11 is a block diagram illustrating a control system of the arrangement of FIG. 10, FIG. 12 is a flow-chart explanatory of functions of the control system of FIG. 11, and FIG. 13 is an electrical block diagram showing electrical circuits employed in the arrangement of FIG. 10.

Before the description of the present invention proceeds, it is to be noted that like parts are designated by like reference numerals throughout the several views of the accompanying drawings.

Referring now to the drawings, there is shown in FIG. 2 the general construction of an oxygen enriched gas supply arrangement according to one preferred embodiment of the present invention. It should be noted here that FIG. 2 merely illustrates general dispositions of each component and the flow of non-permeated gas from an inlet to an outlet of air for general understanding of the arrangement of the present invention, and that the processing of permeated gas or oxygen enriched gas utilizing such an arrangement will be described in detail with reference to FIG. 3 and thereafter.

In FIG. 2, the arrangement generally includes a housing H having a cubic rectangular box-like configuration, a metallic net or filter 21 provided at one side or an air inlet I of the housing H for protecting a membrane cell 1 provided in the housing H in a position subsequent to the filter 21, a fan 22 disposed next to the membrane cell 1 for introducing atmospheric air therethrough into the housing H, a humidity eliminating or dehumidifying section 23 provided in the housing H subsequent to the fan 22, a vacuum pump 24 disposed next to the humidity eliminating section 23, and a pulsation removing section or a buffer 25, for example, in the form of a tank for storing therein the oxygen enriched gas provided subsequent to the vacuum pump 24 and adjacent to an outlet O of the housing H.

In the above construction, atmospheric air is introduced by the fan 22 via the metallic net or filter 21 into the housing H, and oxygen and water vapor in the atmospheric air are passed through selective gas permeating membranes of the membrane cell 1 (to be described later with reference to FIG. 4) for selective removal of oxygen and water vapor from the atmospheric air. Subsequently, nitrogen enriched gas (i.e. gas having less oxygen and water vapor) which does not pass through the selective gas permeating membranes, further flows into the rear portion of the housing H by the action of the fan 22 or is directly discharged from the housing H, and in the case where the nitrogen enriched gas is caused to flow further into the rear portion of the housing H, it is cooled by evaporating water component therefrom at the humidity eliminating section 23, and passed through the vacuum pump 24, and then, may be discharged outside by changing its direction of flow through a flow direction control member 26 provided at the outlet O for regulating the flow direction of the gas. In FIG. 2, although the flow direction control member 26 includes a plurality of control plates arranged in the longitudinal direction, such plurality of control plates may be modified to be arranged laterally with respect to the outlet O, or the flow direction control member 26 may be provided at a side portion or lower portion of the arrangement.

The arrangement in FIG. 2 further includes a sound insulating material 27 provided along inner faces of the housing H and an atmospheric air introducing portion or atmospheric air intake port 28 (to be described later with reference to FIG. 5) provided in one wall of the housing H in a stage subsequent to the membrane cell 1. Since the atmospheric air introducing portion 28 is required to be in contact with atmospheric air having constant oxygen concentration, it is necessary to provide said portion 28 in a position spaced from the flow direction control member 26 for discharging gas.

It should be noted here that in the embodiment of FIG. 2, although the fan 22 is provided behind the membrane cell 1, the arrangement may be so modified as to provide the fan 22 at the air inlet I or at the air outlet O, since it is merely intended to cause gas to flow.

Subsequently, the flow of the oxygen enriched gas passing through the membrane cells will be described with reference to FIG. 3.

In FIG. 3, air indicated by the arrow 30 is passed through a main membrane cell 31 which is normally used at all times and an auxiliary membrane cell 32 for controlling oxygen concentration and flow rate, with oxygen selectively permeating through the membranes. The oxygen enriched gas thus obtained is advanced to a vacuum pump 33, while, at an intermediate portion therebetween, there are provided an inner pressure detecting portion 34 for the gas and the atmospheric air introducing portion 28 (equivalent to the portion 28 in FIG. 2) for controlling oxygen concentration and flow rate. The atmospheric air introducing portion or external air inlet port 28 which is intended to introduce ordinary external atmospheric air (oxygen at 20 vol. %), thereby to control oxygen concentration and flow rate by diluting oxygen enriched gas, may be provided in plurality or may be disposed either before or after the vacuum pump. The enriched gas which has passed through the vacuum pump 33 is further introduced, if necessary, into a humidity eliminating or dehumidifying chamber 36 for removing water content or moisture in the gas. Part of the gas obtained here is fed back by a feed back control 37 for further controlling concentration and flow rate.

The remaining gas may be taken out in the form of a combustion enriched gas through a buffer chamber or pulse eliminating chamber 38 for removing pulsations thereof, if necessary. There are further provided a temperature detector 35 coupled to the cell portion, and a flow rate detector 90, a pressure detector 91, a combustion apparatus 92 and a pressure and flow rate control discharge outlet 93, etc. provided at stages subsequent to the buffer chamber 38 as shown.

Subsequent to the general constructions and flow of gas for the oxygen enriched gas supply arrangement of the present invention described so far, specific constructions and functions of each component thereof will be described in more detail hereinbelow.

In the manufacture of the oxygen enriched gas supply arrangement for combustion, although it is possible to produce an arrangement which may satisfy the required oxygen concentration and flow rate, by preliminarily taking into account, general operating conditions and the like, since control for effecting optimum combustion is further required depending on operating conditions, circumstances of use, etc., the method for making the oxygen concentration and flow rate variable will be first described hereinbelow.

The factors which solely determine oxygen concentration and flow rate in the oxygen enriched gas are the total membrane area and pump capacity. If the membrane area is constant, pressure and air flow rate corresponding to the pump capacity may be obtained, and accordingly, the oxygen concentration and flow rate can be automatically determined. However, it is generally considerably difficult to arrange for the capacity of the pump itself to be variable. Therefore, according to the present invention, it is so arranged that part of the gas discharged from the discharge opening of the pump is returned to the inlet of said pump. By providing a by-pass for feed-back as described above, the pump capacity, although tending to be rather lowered, may be adapted to be variable. By the above system, it becomes possible to control the pressure, and consequently oxygen concentration and flow rate. The system as described above requires only a simple construction in which the inlet and discharge opening of the pump are merely connected by a pipe, with a valve therebetween, and cost increase thereby may be neglected. The specific construction of the above system will be described later with reference to FIG. 5.

In a second system, oxygen concentration and flow rate are arranged to be variable at the membrane cell portion. In FIG. 4, there is shown the construction of such a membrane cell indicated as section 1 which includes a main membrane cell 45 composed of one or more membrane cells and working at 100% in the normal operating state, and a plurality of sets of auxiliary membrane cells 46 each composed of a plurality of membrane cells for use when variations occur in operating conditions or external conditions and occupying approximately 20% of the entire membrane cell, although the above rate may differ depending on various conditions. The membrane cell section 1 further includes one or more control valves 47 for controlling the auxiliary membrane cells 46, said valves 47 being arranged to deal with one or more sets of the auxiliary membrane cells 46. These valves 47 may be of a manually operated type or electrically driven type based on on/off control. In operation, upon opening of the valves 47, the oxygen enriched gas in the auxiliary membrane cells 46 passes through a piping 48 and introduced into another piping 49 through which the oxygen enriched gas of the main membrane cell 45 is passing. By properly controlling the number of the auxiliary membrane cells to be opened through the valve 47, the flow rate or oxygen concentration of the oxygen enriched gas obtained from the membrane cell section 1 may be controlled. When the auxiliary membrane cells 46 are used, the oxygen enriched gas is subjected to such changes that the flow rate increases with constant oxygen concentration, if pressure is kept at a constant level.

Since the gas permeating films employed for the membrane cells 45 and 46 are intended for combustion purpose, a membrane material containing polydimethyl siloxane which has a favorable permeating performance is preferable for obtaining flow rate larger than 20 l/min. at the minimum.

Referring also to FIG. 5 schematically showing the oxygen enriched gas supply system according to the present invention, while passing through the piping 49, the flow of the oxygen enriched gas from the membrane cell 1 is introduced into a pressure sensor 50 on the way, which is arranged to detect the pressure at the permeating gas side of the membrane, thereby measuring the state of the permeating gas from the membrane e.g., temperature, flow rate, etc. Meanwhile, for alterning the state of the oxygen enriched gas in a passage through piping 51, an external air intake port 52 corresponding to the atmospheric air introducing portion 28 in FIGS. 2 and 3 is provided. In this embodiment, the air intake port 52 is provided with a filter 52a, and the amount of intake air is arranged to be adjusted by a valve 53 inserted in a line between the piping 51 and the air intake port 52. The valve 53 is of a flow rate variable type which may be controlled either manually or by a motor. The arrangement as described in the foregoing may be applied to the case where the oxygen concentration is higher than a specified level, with a less flow rate, and the control thereof is of course based on a combination of the valves 47 for the auxiliary membrane cells and a control using a valve 57 for by-passing, using the feed back arrangement to be described later. Subsequently, the gas which has passed through the pipe 51 is introduced into a pressure reduction vacuum pump 55 which is connected to the pipe 51 through an inlet pipe 54 and an outlet pipe 56, with the valve 57 being provided in the pipe 51 at a position between the pipes 54 and 56 for connecting said inlet pipe 54 with the outlet pipe 56. The valve 57 is of a flow rate variable type similar to the valve 53, and may be controlled either manually or by a motor. The valve 57 also has the function of establishing a by-pass passage for reducing pressure at the side of the pipings 49 and 51, and when opened, reduces the oxygen concentration and flow rate of the permeating gas so as to reach specified values. Meanwhile, the control of the valve 53 is of course correlated to various conditions, i.e. factors such as applicability of the auxiliary membrane cell valve 47 and feed back by-passing valve 57, temperature, pressure, flow rate, etc. Described so far has been the control section for achieving the specified flow rate and oxygen concentration required in oxygen enriched gas for combustion, and also for obtaining a constant value with respect to variations in the external conditions. In the above case, the concentration of oxygen ultimately used for combustion in the arrangement of the present invention as described so far, should be less than 39%, which is suitable for burning.

It should be noted here that the auxiliary membrane described as employed in the foregoing embodiment may be omitted, if not required, depending on the operating conditions, and that the control valves may be arranged to be all or partially operated manually.

As already described earlier, in order to control the variations due to temperatures, a temperature sensor 59 is provided at the membrane cell 1 for monitoring temperatures at all times, and upon variations in the temperature, the specified value is achieved through analysis on suitability of the use of the auxiliary membrane 46, introduction of external air, and opening or closing of the by-pass valve 57. As stated previously, in the arrangement according to the present invention, temperature, pressure, permeating flow rate, and oxygen concentration are respectively correlated with each other, and it is possible to manually control these factors, but it is also possible to effect the control based on real time through employment of an automatic central control system to be described in detail later with reference to FIG. 11.

In FIG. 5, since a certain amount of water component or moisture is contained in the oxygen enriched gas obtained through a discharge port 58 of the pump, it is required to remove such moisture therefrom, if necessary. Particularly, when atmospheric humidity is high, if the gas is brought from the pressure reduction state into a normal pressure state or a pressure higher than that through the pump 55, water vapor forms dew, due to the relative temperature difference with respect to the external temperature. By utilizing the above phenomenon, the gas is normally passed through a spiral pipe to be described later so as to take out the water vapor through dew formation thereof by bringing the spiral pipe to normal temperature. The humidity and amount of dew formation depends on the external air temperature. According to the arrangement of the present invention, the inconvenience as described above has been removed by the following method, intended to lower the humidity in the permeated gas as far as possible. Ideally, although the humidity may be lowered by passing the permeated gas through a temperature below 0° C., it is impossible by the above practice to avoid an increase in size of the apparatus, and an increase in the cost for maintenance. Therefore, in the arrangement of the present invention, the problem has been solved by lowering the temperature below normal temperature through a simple construction as far as practicable. More specifically, a material through which water readily penetrates and another material having a favorable heat conduction property are held in close contact with each other, and connected to the piping for the permeating gas. The above arrangement is based on the principle that, when water vapor in a permeating gas forms dew in the piping, the temperature is further lowered for expediting the dew formation through lowering of the temperature by latent heat when the water taken out by osmotic pressure or internal pressure is vaporized.

The specific constructions for the arrangement as described above are shown in FIGS. 6, 7, 8(a) and 8(b).

Particularly, owing to the fact that the oxygen enriched gas for combustion is used in a large amount and subjected to the external conditions of high humidity, and from the necessity for bringing humidity close to the external low humidity conditions, the arrangement of the present invention is characterized in that, water in the form of dew is utilized to achieve a still lower temperature in addition to the dew formation merely by external atmospheric temperatures, so that the latent heat during evaporation of water in the form of dew is fully utilized. The amount of water available from the permeating gas is such that, according to actual measurements, water more than 2 l/hr. in amount is collected at a permeating rate of 30 m$^3$/hr., with the effect being particularly conspicuous during rainy weather, etc. The construction of the humidity eliminating section as shown in FIGS. 6 and 7 is suitable for the case where the external temperatures are low all through the year or where the apparatus is of a compact size. In FIGS. 6 and 7, the humidity eliminating section 62 includes a plurality of plate members 63 each composed, for example, of a rectangular metallic plate 65, and another plate 64 of a similar shape made of capillary material and closely piled upon said metallic plate 65, with said plate members 63 being arranged on the piping from the pump 55 in spaced relation from each other as shown. Each of the capillary material plates 64 is adapted to take out the water component in the form of dew through capillary action, and the water component thus taken outside is evaporated by the nitrogen enriched gas (low humidity gas), while the temperature lowered by the latent heat at this time is transmitted into the oxygen enriched gas through the metallic plates 65 through heat conduction. In FIGS. 6 and 7, there is further provided a filter 66 in the piping for removing solid matters, oil, etc. from the pump, and such a filter 66 may be omitted, if a pump free from discharging of impurities is employed.

Referring further to FIGS. 8(a) and 8(b), there is shown another embodiment of the humidity eliminating section of a still larger size, which is particularly suitable for dealing with a large amount of dew forming water, although based on the same principle as described above. The humidity eliminating section of FIGS. 8(a) and 8(b) includes an evaporating pad 84 composed of the capillary material plate 64 and metallic plate 65 as described earlier, a conduit pipe 87 provided along one surface of the inclined metallic plate 65 opposite to its other surface which is in contact with the capillary material plate 64. The conduit 87 is directed in a zigzag manner into a trap 82 provided at one end of said pipe 87, and another conduit pipe 83 is connected between the bottom portion of the trap 82 and the surface of the capillary material plate 64 of the evaporating pad 84.

In the above structure, when the dew forming water 81 is collected by a predetermined amount in the trap 82 through the pipe 87, the water thus collected in the trap 82 penetrates into the evaporating pad 84 composed of the capillary material plate 64 and metallic plate 65 through the pipe 83 so as to be evaporated by the nitrogen enriched gas for lowering the temperature. The trap 82 is made of a high polymeric material such as a heat insulating material or Teflon and the like for insulation against external temperatures. Meanwhile, in the case where a large amount of water exceeding the amount of evaporation on the pad 84 is recovered, such water is discharged outside through a pipe 86 provided at one edge of the pad 84 in a position adjacent to the trap 82. It is to be noted here that according to this embodiment, the inner pressure of the pipe 87 is in the range of 1500 to 2000 mmHg, although different depending on the conditions of the combustion portion. Therefore, it is possible in terms of principle to increase a height H of the pipe 83 for feeding water up to such a level, but in the actual practice, the height H should preferably be less than 50 cm.

It should be noted here that the humidity eliminating section for the oxygen enriched gas supply arrangement according to the present invention as described in the foregoing may further be modified in various ways, for example, in such manner that, the humidity eliminating section as described with reference to FIGS. 6 and 7 are provided in plurality, or the embodiment shown in FIG. 8 is connected in multiple stages, or the constructions shown in FIGS. 6 and 7 and FIGS. 8(a) and 8(b) may be combined with each other for actual applications.

The humidity eliminating sections described so far are arranged to expedite evaporation by the nonpermeating gas (nitrogen enriched gas) passing through the surface of the membrane, and since the effect is still more improved due to the fact that the non-permeating gas is of a gas having less moisture contrary to the permeating gas, the humidity eliminating section is required to be disposed behind the membrane in the form of a humidity eliminating section 23 as shown in FIG. 2. For the capillary material 64 for leading water into atmosphere in FIGS. 6 and 7, there may be employed paper, cloth, inorganic fibers or mixtures thereof, and, as the metallic plate 65 for conduction of heat, any metallic materials may be adopted, while the number of such plates may be determined based on the capabilities of the apparatus.

As is seen from the foregoing description, according to the construction of the present invention, oxygen enriched gas at a low humidity which could not be achieved at normal temperature, can be advantageously obtained. In the system as described so far, leakage of gas from the penetrating material may seemingly be expected, but as a result of actual measurements, there have been no problems even when the pressure is brought up to 2000 mmHg.

Reference is further made to FIG. 9 showing the flow of gas in the arrangement of the invention in further detail, in which like parts in FIG. 5 are designated by like reference numerals, with detailed description thereof abbreviated for brevity. As shown in FIG. 9, it is particularly necessary to provide the humidity eliminating section 62 as described earlier (FIGS. 6 and 7) immediately after the pump 55. In other words, the humidity eliminating section 62 should be inserted in the by-pass portion between the inlet 54 and outlet 56 for the pump 55. If the dehumidification is effected without passing through the section 62 disposed as described above, dew formation takes place in the vicinity of the valve 57, and thus, water vapor counterflows simultaneously with the variation in the flow rate. There are cases where the oxygen enriched gas dehumidified as described above still has pulsations in its flow, and therefore, such pulsations are prevented by the buffer 25, for example, in the form of a tank as described earlier (FIG. 2). The gas from the buffer 25 is further passed through a flow rate-sensor 90 and also a pressure gauge 91. The pressure gauge 91 may be adapted to be associated with a pressure control releasing valve 93, and it is so disposed that, in the case where the pipe 92 at this portion is subjected to an abnormally high pressure (for example, when the pipe leading to the combustion burner system is stopped, etc.) or where the flow rate is excessive, the pressure is automatically reduced or discharged by the valve 93 into a relief discharge port (not particularly shown). The oxygen enriched gas for combustion as described above is fed into the pipe 92, and is mixed with the combustion gas or combustion liquid fuel from a pipe 94. Moreover, for a burning portion or fuel combustion portion (surrounded by dotted lines in FIG. 9) other than the arrangement as described above, there may be provided a flow rate sensor 95, a pressure sensor 96, etc. for producing oxygen enriched gas of a still higher quality.

Referring to FIG. 10, there is shown a further embodiment of the oxygen enriched gas supply arrangement according to the present invention, in which the overall length of the arrangement is shortened to a compact size, with the membrane cell portion 1 being provided on the upper stage and other portions disposed at the lower stage so as to form the flow of gas into a U-shape configuration. In FIG. 10, like parts in FIGS. 2, 4, 5 and 9 are designated by like reference numerals, with the detailed description thereof abbreviated for brevity.

In the above embodiment of FIG. 10, since the air inlet I and nitrogen enriched gas discharge port O are directed in the same direction, in the case where a large amount of nitrogen enriched gas is to be discharged by the air flow direction control plates 26, it is necessary to avoid entry of the nitrogen enriched gas towards the air intake port 21, for example, by spreading the control plates 26 in the lateral directions.

Subsequently, a control method for stably supplying the specified flow rate and oxygen concentration as described earlier will be explained. The control portions for achieving the above may be concentrated upon three points, i.e. opening and closing of the auxiliary membrane, operations of the atmospheric air introducing valve and by-pass valve, and any of these operations is a function with respect to the flow rate and oxygen concentration. Meanwhile, means for finding the flow rate and oxygen concentration as related to the above operations may be present at several points, i.e. temperature in the vicinity of the membrane, pressure of the permeating gas, and flow rate or pressure at the final intake port. Although the above relations may apparently seem to require complicated operations, it is possible to apply automatic control therefor. More specifically, since the characteristics of the membrane to be employed are those inherent in the membrane material, the automatic control is possible through mere calculating processing by finding out the differential pressure $\Delta P$, permeating amount J, oxygen concentration NO2, and permeability coefficient PT with respect to temperature, of the membrane itself.

In the practical applications, with the employment of a micro-computer, a plurality of spots at the sensor portion are measured, and based on the findings therefrom, variations from the specified values are observed for comparative calculations with respect to the characteristics of the membrane itself, and decision is made by predicting which of the control valves at several places should be operated to achieve best result for obtaining the optimum flow rate and oxygen concentration.

More specifically, the control as described above is effected by the construction as shown in FIG. 11.

In FIG. 11, an input from the pressure sensor 50 in FIG. 5 for a line 111 is regularized by an operational amplifier 114 and then, fed, through a selector 115 into a processing circuit 116 so as to be subjected to A/D conversion thereat for effecting calculations and other processings. Meanwhile, the output of the temperature sensor 59 in FIG. 5 applied to a line 112 is fed, after room temperature correction, into the operational amplifier 114, and is then, applied to the processing circuit 116 through the selector 115. Similarly, the output from the flow rate sensor 90 in FIG. 9 for a line 113 is applied to the processing circuit 116 through the operational amplifier 114 and selector 115. The data obtained at the processing circuit 116 through calculation and processing thereat are compared with the membrane chacteristics memorized in a read only memory ROM 117, for example, the characteristics as shown in FIG. 1(b), which are the fundamental data of the membrane to be employed.

On the other hand, for setting the initial values for the combustion conditions, input is effected by a keyboard 63, which is coupled to a display device 64 therefor. The conditions to be designated are determined by the comparison of the values input by the keyboard 63 and the membrane characteristics, with subsequent determination of the control method for display. Simultaneously, instructions are given to a valve driving motor controller 120 for driving the valve 53. Similarly, the valve 57 is controlled by a valve controller 121 and the valve 47 by a valve driving controller 122. By the repetition of the functions as described above, accuracy is gradually improved. The data and corrected data at this time are stored in a random access memory RAM 118. The control is effected in the manner as described above.

It is to be noted that in FIG. 11, the portion 66 surrounded by dotted lines shows one example of a CPU (central processing unit), and, although different according to the kinds, is intended to determined optimum conditions for control method through comparative calculations of various data with membrane characteristics, and that according to this method, it is possible to further correct membrane characteristics with respect to the complicated changes in external conditions for achieving optimum results.

The flow-chart in FIG. 12 shows the foregoing method as observed from the view point of soft ware.

Referring now to FIG. 13, the electrical circuit and safety device circuit employed for the oxygen enriched gas supply arrangement according to the present invention will be described hereinbelow, in which solid lines are related to a power supply circuit, while chain lines are coupled to a control circuit.

Firstly, powers from a vacuum pump driving three phase power source 131 and a single phase 100 V power source 132 are fed into an open/close control box 135 respectively through power supply prevention breakers 133 and 134 coupled thereto, and further supplied to corresponding components through thermal type overcurrent preventing breakers 136 and 137, to which indicator lamps or LED indicators 152 and 153 are coupled for indication of state of functions. The power supply of 100 V flowing through a line 140 from the breaker 137 is subjected to DC conversion by each controller, and is fed to the CPU 66, a fan 22, indicator lamps 154, an alarm buzzer 150, and also to a controller 144 for each valve, which are all connected to the line 140. A power supply or a battery 145 is coupled through a line 102 to the CPU 66 as a CPU back-up power source for use in case of trouble in the 100 V power supply 132 or power failure, and also as a power source for an alarm buzzer 146 connected to the CPU 66. Secondly, with respect to the control circuit, when the data input through a line 147 are detected to be of abnormal values (for example, values largely deviated from the specified values, or values uncontrollable), the control box 135 is driven through a line 148 connected between the CPU 66 and the control box 135 for cutting off the power supply, and the alarm buzzer 150 is actuated through a line 149 connecting the CPU 66 to said buzzer 150, while the controller 144 is driven by a line 151 connected between the CPU 66 and said controller 144. An indicator 155 is further connected to the CPU 66 for indicating the state of functions thereof.

As is clear from the foregoing description, the oxygen enriched gas supply arrangement for combustion purpose according to the present invention is suitably utilized as an air aupply source for various combustion equipment and apparatuses, and is especially superior as the air supply source for combustion apparatuses utilizing high temperatures such as burners used for glass melting, glass processing, metal melting, ceramic calcination, etc., boilers for general purpose or various forging operations, and further, high temperature furnaces and the like.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An apparatus for providing an air supply enriched in an oxygen concentration which can be selectively varied for use for combustion purposes which comprises, in combination:

a membrane cell divided into a main gas permeating membrane including means for causing atmospheric air to flow through and along the surface of said main gas permeating membrane to obtain an oxygen enriched air stream, means for supplying air to said membrane cell, a plurality of auxiliary membranes connected in parallel with said main gas permeating membrane, including means for optionally directing at least a portion of the atmospheric air through said auxiliary membranes to obtain an oxygen enriched air stream, means for controlling the number of auxiliary membranes to be utilized thereby controlling the flow rate of oxygen concentration of the oxygen enriched air obtained from the membrane cell together with pressure adjustment, pressure reduction means having an inlet and outlet for causing atmospheric air to pass through said main membrane and auxiliary membranes, said pressure reduction means being disposed downstream from said main membrane and auxiliary membranes for providing oxygen enriched air to be adapted as combustion air to burn fuel in combustion, by-pass means communicating at one end with said outlet of said pressure reduction means, and at a second end with said inlet of said pressure reduction means for recycling at least a portion of the air from said outlet to said inlet, said by-pass means containing means for controlling the amount of air to be recycled, first atmospheric air inlet means connected with said inlet of said pressure reduction means for adjustably supplying atmospheric air to said inlet and second atmospheric air inlet means connected with said outlet of said pressure reduction means for adjustably supplying atmospheric air to said outlet, wherein the amount of the oxygen concentration of the air to be discharged from the outlet of the pressure reduction means for use in combustion is selectively varied by the operation of the main and auxiliary membranes for control of the concentration and flow rate of the enriched air, the by-pass means and the first and second atmospheric air inlet means.

2. The apparatus of claim 1 wherein the pressure reduction means comprises a vacuum pump means.

3. The apparatus of claim 1 further comprising means operatively associated with said oxygen enriched air stream for controlling the humidity of said oxygen enriched air obtained from the main membrane cell and auxiliary membrane cells to a predetermined value.

4. The apparatus as claimed in claim 3, wherein said means for controlling the humidity of the oxygen enriched air to a predetermined value comprises a dehumidifying device including a material for absorbing water and another material for conducting heat, said materials being adhered to each other, said structure being arranged to contact, at one portion thereof, the oxygen enriched air or condensate in said oxygen enriched air, and at the other portion thereof, atmospheric air or nitrogen enriched gas.

5. The apparatus of claim 4 wherein the material for absorbing water and the material for conducting heat are in the form of plates which are in direct contact with each other and extend into the oxygen enriched air gas stream and into the atmospheric air or nitrogen enriched air, whereby water present in the oxygen enriched air is absorbed and removed from the gas stream through capillary action by the material for absorbing water, said water being evaporated by the nitrogen enriched atmospheric air, the reduced temperature created by said evaporation being transmitted by said metallic plates through heat conduction into the oxygen enriched air stream which in turn lowers the temperature thereof causing water to fall out in the form of dew.

6. The apparatus of claim 4 wherein the absorbing material is selected from the group consisting of paper, cloth, and inorganic fibers.

7. The apparatus of claim 3 wherein the humidity controlling means comprises an inclined evaporating pad composed of a capillary material plate disposed on a metallic plate, a first conduit pipe provided along one surface of the inclined metallic plate and terminating in a trap, and a second conduit pipe connecting the trap to the surface of the capillary material plate of the evaporating pad whereby the water removed from the oxygen enriched air stream and collected in the first conduit pipe and the trap is taken by the second conduit pipe to the capillary material plate where it is evaporated by the nitrogen enriched atmospheric air, the reduced temperature created by said evaporation being transmitted by said metallic plates and said first conduit pipe through heat conduction into the oxygen enriched air stream which in turn lowers the temperature thereof causing water to fall out in the form of dew.

8. The apparatus of claim 1 further comprising means for removing pulsations in the oxygen enriched air, whereby an oxygen enriched air efficiently usable for combustion is obtained.

9. The apparatus as claimed in claim 8, wherein the means for removing the pulsation in the oxygen enriched air is a tank for storing the oxygen enriched air therein.

10. The apparatus of claim 1, wherein the flow of air through the main and auxiliary gas permeating membrane, the by-pass means and the atmospheric air inlet means is automatically controlled by a micro-computer means.

11. The apparatus as claimed in claim 1, wherein a further means for controlling the flow rate and/or oxygen concentration of the oxygen enriched air includes a relief discharge port and a flow rate adjusting value provided at an end portion of the oxygen enriched air discharge opening for ultimately controlling flow rate of the necessary oxygen enriched air, and a pressure control releasing valve for releasing abnormal pressure.

12. The apparatus of claim 1 wherein both the main gas permeating membrane and the auxiliary gas permeating membrane are made of a material selected from the group consisting of polydimethyl siloxane, polybutadiene, ethyl cellulose, polypropylene and polystyrene.

* * * * *